Sept. 27, 1949.    E. MONTAGNÉ    2,482,861
MEANS FOR TESTING REDUCED SCALE
PATTERNS OF ENGINEERING WORKS
Filed Nov. 20, 1945
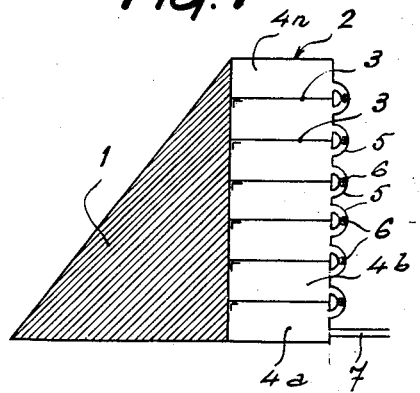
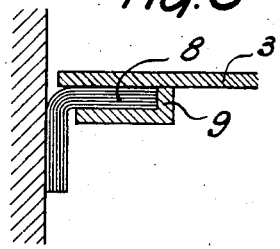
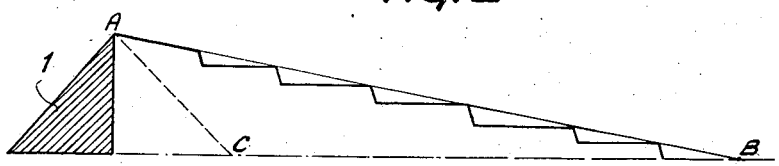
INVENTOR.
Eliseé Montagné
by: John H Graham
HIS AGENT.

Patented Sept. 27, 1949

2,482,861

UNITED STATES PATENT OFFICE 2,482,861

MEANS FOR TESTING REDUCED SCALE PATTERNS OF ENGINEERING WORKS

Eliseé Montagné, Saint-Girons, France, assignor to Societe L'Entreprise Industrielle, Paris, France, a corporation of the French Republic Application November 20, 1945, Serial No. 629,827
In France July 9, 1941

Section 1, Public Law 690, August 8, 1946
Patent expires July 9, 1961

4 Claims. (Cl. 73—432)

It is of interest from numerous standpoints to study the conditions of resistance in engineering works and in particular in the case of dams across valleys, this study being executed by means of reduced scale models or patterns. It is necessary, if the points of the reduced scale pattern which it is desired to study experimentally is to be submitted to the same pressures as those affecting the real structure at the corresponding point, to replace water by a liquid the specific weight of which is equal to the ratio between the height of the work and that of the patterns. With mercury the specific weight of which is 13.6, the reduced scale pattern of an engineering work having say a height of 100 m. should have a height of $$\frac{100}{13.6}$$

i. e. 7.35 meters. The amount of mercury is then considerable and leads to the immobilisation of hundreds of thousands of dollars so that the tests may generally be executed only in government or the like laboratories.

Builders have been also led very often to the execution of a pattern made of plaster with a view to reducing the size of the pattern and thereby the volume of mercury to be used and the ratio between the resistance of plaster and concrete is then taken into account for the calculation required by the tests; but it is certain that a greater reliability may be provided by using the same material both for the pattern and for the actual engineering work. Now, a pattern the height of which is 1 meter should be tested with a liquid having a specific weight of $13.6 \times 7.35 = 100$, which is obviously impossible.

My invention has for its object a method and means for submitting a reduced scale pattern of an engineering work to stresses as high as desired and in particular to the same stresses as the real works i. e. to the same stresses as if it were tested with a liquid the specific weight of which is inversely proportional to the reduction ratio of said pattern, whatever may be said reduction ratio.

Said improved method has for its chief feature the fact of submitting the pattern to the action of a liquid under pressure, the pressure in which liquid varies stepwise from the bottom to the top of this pattern in accordance with a law approximating the natural law governing the stresses exerted by a mass of liquid located behind said patterns or works.

The arrangement according to my invention for the execution of said method is characterised by the arrangement of the pattern to be tested in a manner such that its rear surface forms one of the walls of the reservoir filled with water under pressure, said reservoir being subdivided by horizontal partitions into a series of communicating compartments interconnected through adjustable ports producing a loss of load and thereby a drop in pressure from one compartment to the next.

Appended drawings show by way of example a form of execution of the invention in order to allow an easier understanding thereof.

Fig. 1 is a diagrammatic view of the system according to the invention.

Fig. 2 is a diagram showing the distribution of the corresponding stresses.

Fig. 3 is a cross sectional view of a detail of execution of the arrangement.

In said drawings, 1 designates the pattern of the reduced scale dam to be tested. According to my invention, I arrange to the rear of the vertical surface of the dam pattern a caisson or reservoir 2, subdivided by intermediary partitions 3 into compartments 4a, 4b—4n communicating together by means of pipes 5, inside which are inserted valves or cocks 6, the opening of which is adjustable.

In the lower compartment is arranged a duct 7 for the admission of water under pressure, said duct being fed by a hydraulic pump, not illustrated, said pump being capable of producing the desired test pressure as predetermined in the manner disclosed hereinafter.

The fluid tightness between the different partitions and the rear surface of the pattern 1 may be ensured very simply by a yielding square-shaped packing 8 (Fig. 3) one leg of which engages with considerable friction the U-shaped recess 9, provided for giving a greater rigidity to the partition 3. The fluid tightness is thus obtained through the very pressure of the water prevailing inside the compartment 4, and urging the yielding packing against the rear surface of the pattern without the partition 3 exerting any direct mechanical pressure on the pattern.

As disclosed hereinabove the pressure of the water entering the lower compartment 4a, is reduced stepwise from one compartment to the next by reason of the loss of head produced by the valves 6. These valves act after the manner of the baffle walls located in front of the joints in certain hydraulic or steam turbines with a view to reducing the importance of the leaks.

The top compartment 4n is open to the atmosphere, thus permitting some flow of water therefrom and reducing the pressure at the surface to that of the atmosphere.

In brief, the provision of the connecting valves or cocks 6, in the communication means between successive compartments leads to a succession of expansions from one compartment to the next in a manner such that in the highest compartment the pressure becomes finally zero.

I have shown in Fig. 2, a diagram giving out the pressures thus obtained in the case for instance of a pressure of 7 kgs. for the water admitted into the lowermost compartment. The valves 6 are adjusted in a manner such that the pressure decreases by 1 kg. from one compartment to the next so as to enter the last compartment under a pressure of 1 kg.

It is apparent that the result thus obtained is substantially similar to that obtained by submitting the reduced scale dam pattern to tests with a liquid the specific weight of which is 7.

As a matter of fact the triangle of the thrust pressures would in such a case be given out by a straight line AB and obviously the stresses to which are submitted the vertical slices of the dam are substantially equal when considered along the unbroken line AB or along the broken line shown in full and giving out the stresses due to the pressure of compressed water.

When it is desired to increase the similarity between the two cases, it is only necessary to increase the number of intermediary partitions and to reduce thereby the drop in pressure at each step.

In order to allow a better understanding of my invention, I have drawn in Fig. 2 the line AC corresponding to the triangle of the thrust pressures produced by a liquid the specific weight of which is 1.

As disclosed hereinabove it is possible to modify as desired the value of the stresses to which the dam pattern is submitted and to make said stresses rise up to a value corresponding for instance to a specific weight of 100 for the liquid in the case of a pattern reduced to 1/100.

In any case, the study of the resistance of the dam may be prosecuted up to considerable strains and even up to breaking point. It is sufficient to increase the pressure for increasing the load above normal and ascertaining the safety coefficient of the works. Such an advantage, which is considerable, cannot be obtained in any manner with the usual methods as the specific weight of the liquid cannot by any means be caused to vary in a gradual manner for producing a variation in the stresses to which the pattern to be tested is to be submitted.

My invention is however by no means limited to said practical forms of execution of the partition system disclosed by my invention and the forms of execution given out in Figs. 1 and 2 are simply shown by way of examples.

What I claim is:

1. An arrangement for testing dams and the like engineering works comprising a reduced scale pattern, a reservoir one of the walls of which is formed by the rear surface of said pattern, horizontal partitions subdividing said reservoir into a plurality of superposed compartments, adjustable means for allowing communication between each compartment and the adjacent superposed compartment with a predetermined loss of head from one compartment to the next and means for admitting water under pressure to the lower-most compartment.

2. An arrangement for testing dams and the like engineering works comprising a reduced scale pattern, a reservoir one of the walls of which is formed by the rear surface of said pattern, horizontal partitions subdividing said reservoir into a plurality of superposed compartments, a plurality of pipes, a pipe connecting each compartment with its adjacent superposed compartment, adjustable cocks inserted in said pipes for adjusting the drop in pressure between the corresponding compartments and means for admitting water under pressure to the lowermost compartment.

3. An arrangement for testing dams and the like engineering works comprising a reduced scale pattern, a reservoir one of the walls of which is formed by the rear surface of said pattern, horizontal partitions subdividing said reservoir into a plurality of superposed compartments, adjustable means for allowing communication between each compartment and its superposed compartment with a predetermined loss of head from one compartment to the next, square-shaped packings each having a horizontal and vertical leg applied against the rear wall of the pattern and each of the partitions, means for securing the horizontal leg of the packing to the corresponding partition, the vertical leg thereof being urged against the rear wall of the pattern by the liquid pressure and means for admitting water under pressure to the lower-most compartment.

4. An arrangement for testing dams and like engineering structures comprising in combination: a pattern of the dam on a reduced scale; a reservoir, one of the walls of which is formed by the rear surface of said pattern; horizontal partitions dividing the interior of said reservoir into a plurality of superposed compartments; means for admitting liquid under superatmospheric pressure to one compartment; fluid flow conducting means between each compartment and its adjacent superposed compartment; and fluid flowing adjusting means in each of said communicating means, each adjusting means being independently controlled to permit controlled reduction of pressure of liquid progressively between the compartments.

ELISEÉ MONTAGNÉ.

REFERENCES CITED

The following references are of record in the file of this patent:

A publication entitled, Building and Testing an Arch Dam Model by A. V. Karpov and R. L. Templin, on pgs. 11–16 of vol. 2 of Civil Engineering, Jan. 1932, published by American Society of Civil Engineers, 33 West 39th St., New York city.